United States Patent [19]
Weber

[11] Patent Number: 5,230,637
[45] Date of Patent: Jul. 27, 1993

[54] BATTERY JUMPER CABLE

[76] Inventor: William P. Weber, 44 Robinhood Rd., Danbury, Conn. 06810

[21] Appl. No.: 756,429

[22] Filed: Sep. 9, 1991

[51] Int. Cl.⁵ .............................................. H01R 11/00
[52] U.S. Cl. ..................................... 439/504; 320/25; 320/26; 320/48; 320/54; 439/476; 439/490; 439/506; 439/503
[58] Field of Search .............................. 439/502–506, 439/513, 188, 476, 480, 489, 490; 320/2, 25, 26, 48, 54

[56] References Cited

U.S. PATENT DOCUMENTS

| | | | |
|---|---|---|---|
| 1,955,967 | 4/1934 | Leathers | 439/476 |
| 4,157,492 | 6/1979 | Colbrese | 320/25 |
| 4,163,134 | 7/1979 | Budrose | 439/504 |
| 4,166,241 | 8/1979 | Grant | 320/25 |
| 4,238,722 | 12/1980 | Ford | 439/504 |
| 4,272,142 | 6/1981 | Zapf | 439/504 |
| 4,366,430 | 12/1982 | Wright | 439/504 |
| 4,607,209 | 8/1986 | Guim et al. | 320/25 |
| 4,871,957 | 10/1989 | Taranto et al. | 439/504 |
| 4,938,712 | 7/1990 | Black | 320/25 |

Primary Examiner—Paula A. Bradley
Attorney, Agent, or Firm—Edward R. Hyde

[57] ABSTRACT

An apparatus and method for jumping or charging a discharged automobile battery in order to start an automobile. Jumper cables are provided having indicator lamps to insure correct polarity connecting of cables. A switch, controlled manually or by timer establishes connection between the charged and discharged battery to charge the latter for a predetermined period of time. A circuit breaker to automatically disconnect the circuit in a situation where a dangerously high content would flow.

2 Claims, 2 Drawing Sheets

BATTERY JUMPER CABLE

BACKGROUND OF THE INVENTION

1. Field of the Invention

The present invention relates to a system for interconnecting batteries and more particularly to apparatus for jumping automobile batteries to start an automobile or charge a discharged battery.

The type of batteries normally found in automobiles are lead-acid type that generate gases which, if ignited, can explode resulting in considerable damage or injury.

A usual situation in which there is danger of an exploding battery is when an automobile battery has been discharged and it is determined to jump start the car with a battery in another car. In such situations as the cables between the charged battery and the discharged battery are being connected sparks can occur and these sparks can result in ignition of the battery gases. Conventionally, automobile battery jumper cables carry a tag in which instructions are written on the proper method and sequence of connecting the cables. Nevertheless, situations can occur when the instructions are not properly followed or through misinterpretation or otherwise and a spark occurs. A battery can be damaged if charged at too high a rate. An undamaged battery will allow the proper rate of charge from another undamaged battery, but if one battery has developed an internal short circuit within one of its cells, an unusually high rate of current could pass causing aggravated damage and possible an explosion.

It is to this general problem that the present invention is directed.

2. Description of the Prior Art

The prior art has recognized the above discussed problem and various types of jumper cables have been designed in an attempt to insure proper connection of the cables and elimination of the possibility of gas igniting sparks. Representative of the prior art is U.S. Pat. No. 4,166,241 in which there is a relay switch to maintain one of the cables in an open circuit condition while the connections are being made and also appropriate indicating lamps to indicate to the operator that the cables are correctly connected to the two batteries in regard to their polarity.

Although some of these patents may decrease the possibility of sparks and resulting fire or explosion, they do not eliminate such dangers.

SUMMARY OF THE INVENTION

A primary object of the present invention is to provide a method and apparatus for quickly, conveniently and safely jump-starting and charging an automobile battery from a charged battery.

Another object of the present invention is to provide a method and apparatus for jump-starting and charging an automobile battery from another battery in which there is a minimum chance of damage from sparks igniting the battery combustible gasses.

The invention contemplates a pair of battery cables that are adapted to be connected to the terminals of two batteries, one of which is essentially discharged and the other of which is charged. Both batteries may be located in different automobiles. A diode circuit is provided toward the two outer ends of a pair of cables to insure that they are properly connected to the batteries in so far as polarity is concerned. That is, one cable has both its ends connected to the two positive terminals whereas the other cable is connected to the two negative terminals of the batteries.

One of the cables is interrupted by a manually controlled switch and a circuit breaker both of which are enclosed within a housing that is conveniently, manually held for control of the cable switch. An important feature of the invention is that the switch is adapted to be closed for a controlled period of time which is sufficient to adequately charge the discharged battery to start the automobile. The controlled period of time may be achieved by manual operation and operator timing or by an automatic timing mechanism as hereinafter described and explained. Another important feature is a circuit breaker. In the event that the discharged battery has an internal short circuit, due to a cell failure, the circuit breaker will sense the unusually high current draw and automatically open the circuit to avoid a potentially dangerous situation.

BRIEF DESCRIPTION OF THE DRAWINGS

The foregoing and still other objects and advantages of the present invention will be more apparent from the following detailed explanation of the preferred embodiments of the invention in connection with the accompanying drawings herein in which.

DESCRIPTION OF THE PREFERRED EMBODIMENTS

Figure 1:
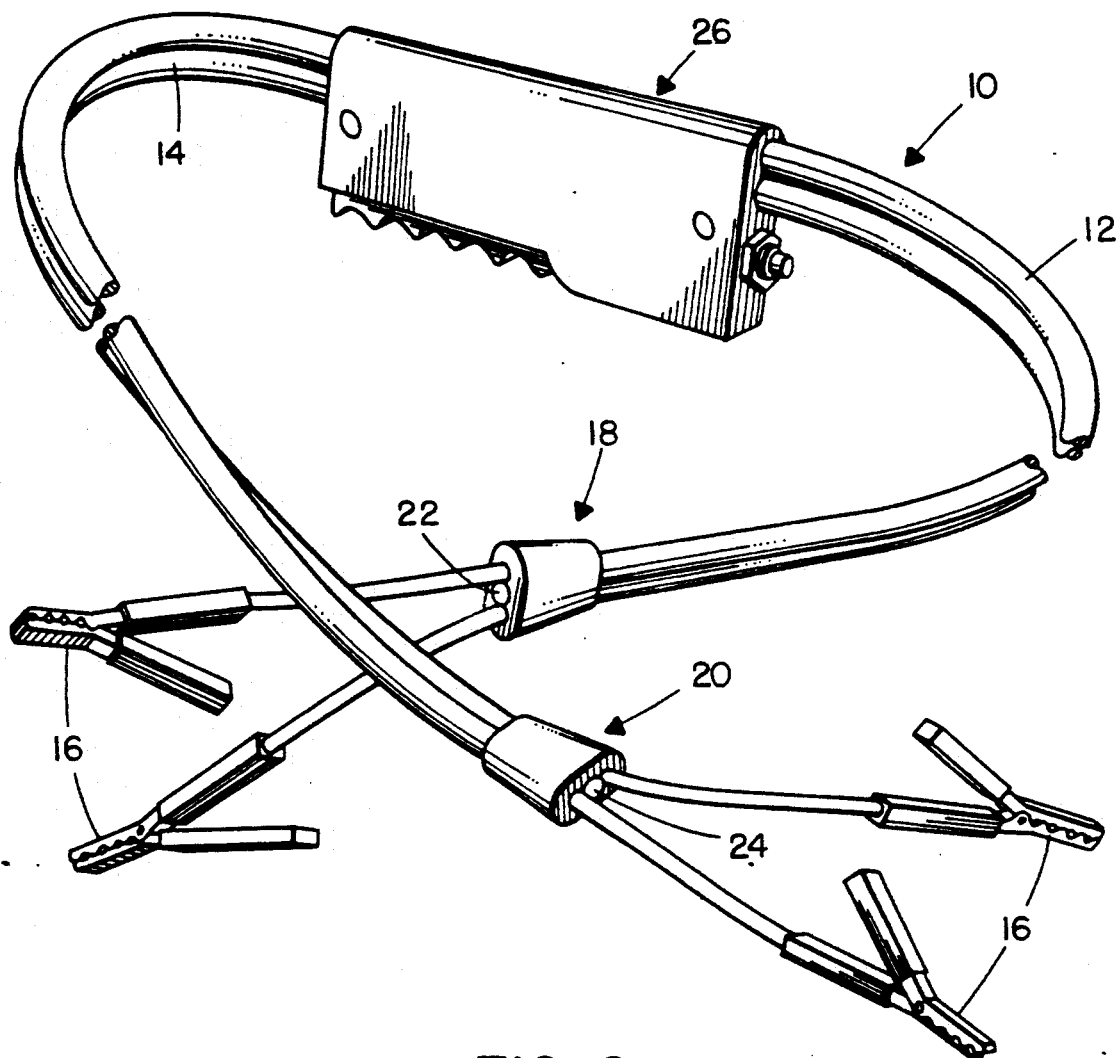
FIG. 1 is a perspective view of a cable system of the present invention.

Referring now to the drawings and more particularly to FIG. 1, numeral 10 indicates the battery jumper cable system which includes a pair of cables 12 and 14 which may be of stranded copper wire of 10 gauge for heavy duty high current carrying capacity. Each of the cables is suitably covered with insulation and the two cables may be secured together throughout most of their length as shown in FIG. 1. Each end of each cable includes a copper clamp 16 for connecting the cables to the terminals of automobile type batteries.

Connected to the pair of cables, toward each end thereof are diode indicator units 18, 20 to indicate to the user or operator when the cables are properly connected to the batteries. Each of these units includes a diode and a lamp 22, 24 which are located where they can be conveniently and readily observed by the operator. The operation of these units will be described hereinafter.

Figure 2:
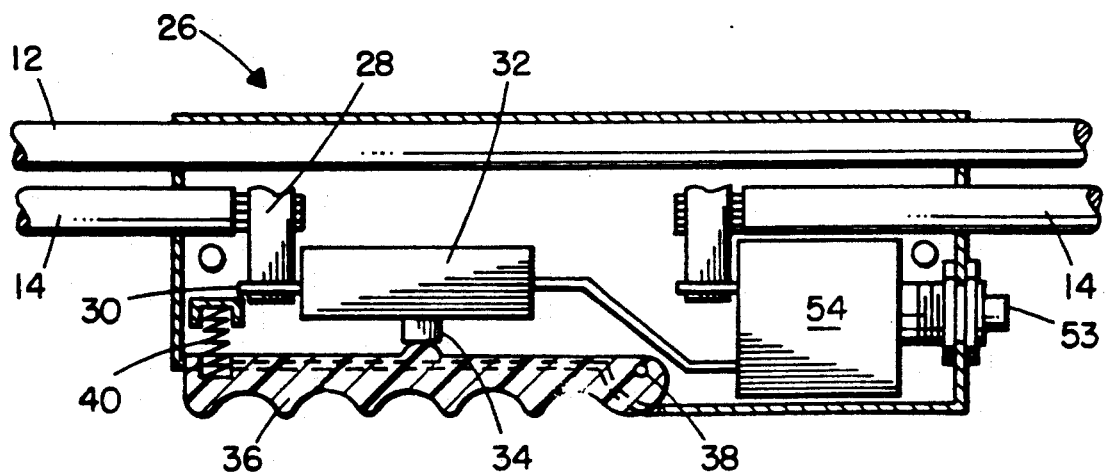
FIG. 2 is a cross section of the switch mechanism.

Connected to the pair of cables and interposed in cable 12 is a switch and circuit breaker mechanism generally indicated by numeral 26 and shown in detail in FIG. 2. It is seen that there is a break in cable 14 where it is spliced to a connector 28 which is secured to a terminal 30 of switch 32. The latter is of the type that is normally in an open condition and only closed when switch pin 34 is depressed which would be in an upward direction in FIG. 2. A multifinger hand grip 36 is pivotally mounted as at 38 and spring-urged outward or downward by spring 40. Thus in the normal condition hand grip 36 is pivoted outwardly, switch pin 34 is extended and switch 32 is in an open position providing a discontinuity in cable 14.

When it is desired to complete the circuit of this cable, grip 36 is pivoted upwardly to depress switch pin 34 and close the contacts within switch 32. The two sections of cable 14 then form a completed circuit which will remain in the completed condition as long as hand grip 36 is held by the operator in a depressed position or pivoted upward in FIG. 2. When the operator releases the hand grip the switch will promptly open its contacts. If there is an internal short within either battery, especially the discharged one, and the operator is not able to recognize this problem, the circuit breaker will automatically open.

Figure 3:
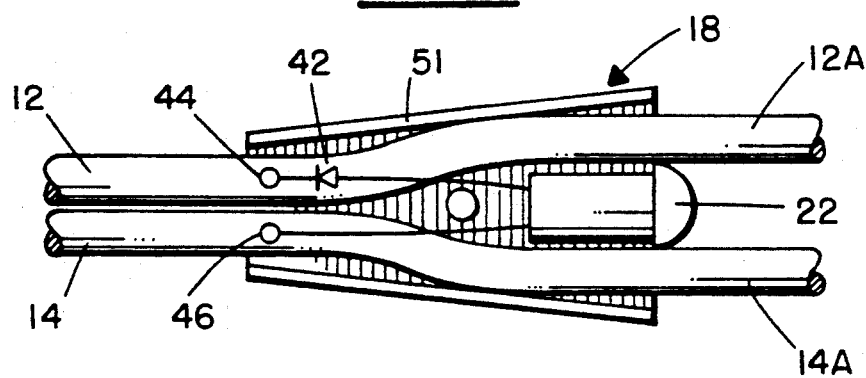
FIG. 3 is plan view with the cover broken away of a diode indicator element.
Figure 4:
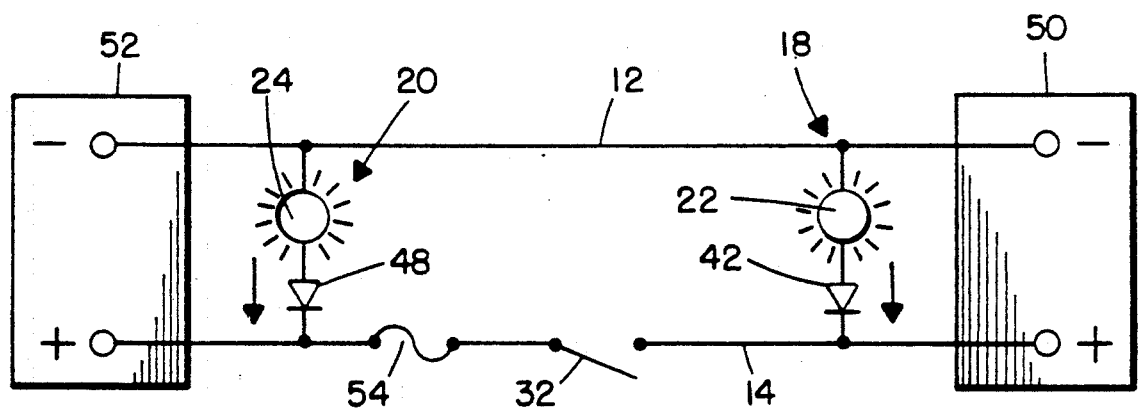
FIG. 4 is a schematic view of the system connected to two batteries.

Referring now to FIG. 3 there is a detailed showing of the indicator unit 18. It is seen that the cables 12 and 14 which are normally joined together throughout most of their length are separated as indicated at 12a, 14a and the unit 18 is located at this separation of the cables. The unit includes a diode 42 and indicator lamp 22 connected in series and to the cables 12, 14 as at connections 44, 46. A similar unit 20 including diode 48 and lamp 24 as shown in FIG. 4 is connected toward the other end of the pair of cables. Each of the units 20 and 18 are suitably encased in a cover such as 51 which may be of a plastic material. The top of the cover 51 is cut away in FIG. 3 to show the internal structure of the diode indicator unit.

The electrical schematic is shown in FIG. 4 and includes a pair of batteries 50, 52, one of which is charged and the other essentially discharged. It is understood that the batteries may be located in different automobiles. It is seen that cable 14 includes a circuit breaker 54 which may be a 30-amp thermal type unit that is conveniently located within the switch unit 26. The circuit breaker is reset by reset button 53.

In operation, it might be assumed that battery 50 is the charged unit and 52 the discharged battery, in which case, cable 14 would be connected to the positive terminal of battery 50 and then to the positive terminal of battery 52. Cable 12 would then be connected to the negative terminal of battery 50 and if the cables at this point are properly connected, diode 42 will conduct and indicator lamp 22 will light to tell the operator of the correct connection. The other end of cable 12 will then be connected to the negative terminal of battery 52 and if the connection is proper, diode 48 will conduct and lamp 24 will indicate the correct connection. The operator will then depress grip 36 to close the main switch 32 thereby completing the circuit between the batteries resulting in battery 52 commencing to charge. It has been found that a one-minute charge time is sufficient to charge a discharged battery to the point where it will start the automobile. Thus the operator will hold switch 32 closed for a one-minute period after which he will release his grip to open the switch and at this point battery 52 will be able to start the automobile in which it is located. At this point the automobile starter is depressed and the cable circuit is open because switch 32 is in an open position. A feature of the system is that when the automobile having the originally discharged battery is started, the charged battery is not part of the starting circuit because switch 32 has been released.

Figure 5:
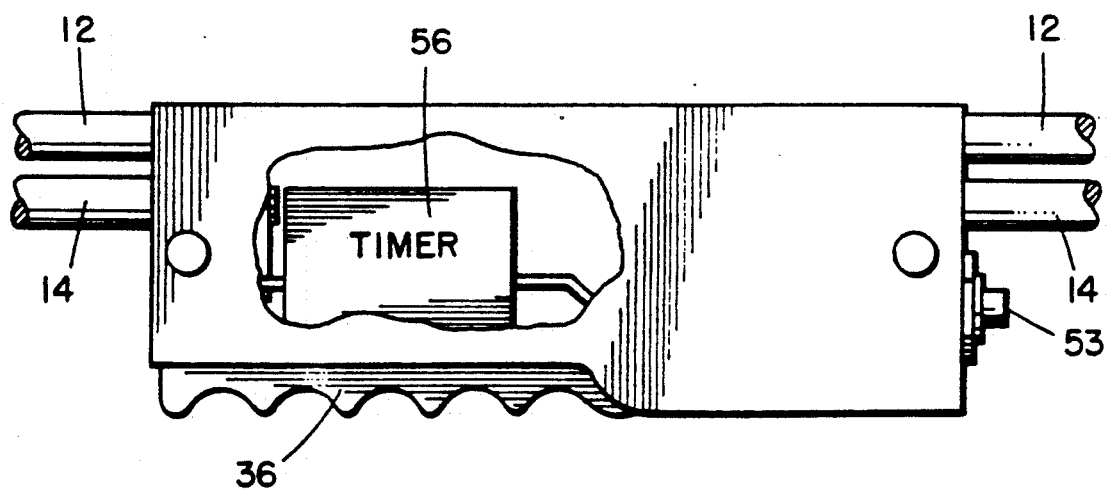
FIG. 5 is a view of an alternative switch arrangement.

An alternative arrangement is shown in FIG. 5 in which the switch 32 includes a timer mechanism 56. The timer may be of any suitable design and could be a mechanical or electronic timer. It would be set for approximately one minute and the timer would start when the switch actuating grip 36 is depressed to close switch 32. This would close the circuit which would remain closed even upon release of the switch grip 36 until the timer has gone through its cycle at which time the switch 32 would open and there would be a discontinuity in cable 14. The timer could be adjustable so that the operator can select the appropriate time necessary to charge the discharged battery.

Having thus described the invention with particular reference to the preferred forms thereof, it will be obvious that various changes and modifications may be made therein without departing from the spirit and scope of the invention as defined in the appended claims.

What is claimed is:

1. Apparatus for jumping a first battery to a second battery comprising:

a first and second electrical jumper cable secured together throughout a substantial length thereof;

a manually operable clamp secured to each end of each jumper cable to connect the jumper cable ends to battery terminals;

switch means having contacts interposed in a circuit path of the second jumper cable having normally open contacts to open the electrical circuit of the second jumper cable thereby providing a first and second section thereof;

first serially connected electrical diode and indicator means connected to the first cable and the first portion of the second cable;

second serially connected electrical diode and indicator means connected to the first cable and the second portion of the second cable;

each of said diodes being connected to conduct electrical current in the same direction relative to their respective connections between the first and second cables;

manually operable means to control the said switch means;

spring means connected to urge the manually operable means to a first position whereby the switch means contacts are in their normally open position; and means whereby the manually operable means may be manually moved to a second position to close the contacts of the switch means to close the circuit path of the second jumper cable.

2. Apparatus as set forth in claim 1 in which the manually operable means is a pivotally mounted hand grip;

said switch means including a switch pin in contact with the pivotally mounted hand grip; and said spring means being in contact with the end of the hand grip remote from the pivotal point thereof whereby the release of manual pressure on the hand grip causes it to pivot under the pressure of the spring means to open the said switch means.

* * * * *